United States Patent [19]

Lehnert et al.

[11] Patent Number: 4,680,784
[45] Date of Patent: Jul. 14, 1987

[54] TRAFFIC SIMULATOR FOR TESTING EXCHANGES TAKING THE SUBSCRIBER-SYSTEM INTERACTION INTO ACCOUNT

[75] Inventors: Ralf Lehnert, Kalchreuth; Phuoc Tran-Gia, Bietigheim-Bissingen; Wolfram Lempennau, Stuttgart, all of Fed. Rep. of Germany

[73] Assignee: U.S. Philips Corporation, New York, N.Y.

[21] Appl. No.: 812,147

[22] Filed: Dec. 23, 1985

[51] Int. Cl.[4] ............................................. H04M 3/28
[52] U.S. Cl. ....................................................... 379/11
[58] Field of Search .................... 179/175.2 D, 175.21, 179/175.23, 175.2 R, 175.2 C

[56] References Cited

PUBLICATIONS

Exchange Traffic Simulator, G. Conroy and J. Davis, Telecommunications Journal Australia, vol. 30, No. 2, 1980, pp. 141–145.

Primary Examiner—Stafford D. Schreyer
Attorney, Agent, or Firm—Thomas A. Briody; Jack Oisher; William J. Streeter

[57] ABSTRACT

With the aid of a traffic simulator telephone exchanges can be tested, the simulator imitating the traffic conditions in the exchange. To that end, the traffic simulator of the invention comprises, in addition to circuit means for simulating subscriber and line behavior, a program-controlled control arrangement connected thereto which generates random variables such as call distances, call durations and reaction periods, controls the test run and checks the reactions of the exchange, and also mixes the exchange-technical parameters. To obtain a realistic picture of the traffic conditions, a plurality of subscriber and line simulation are provided which are changeable in dependence on the reaction of the exchange. On the basis of the exchange reaction (signifying an event) a realistic picture of the external conditions of the exchange are obtained by linking such reactions with random variables and event instants.

3 Claims, 4 Drawing Figures

TRAFFIC SIMULATOR FOR TESTING EXCHANGES TAKING THE SUBSCRIBER-SYSTEM INTERACTION INTO ACCOUNT

BACKGROUND OF THE INVENTION

1. Field of the Invention

The invention relates to a traffic simulator for testing exchanges, which simulator imitates the behaviour of subscribers and/or lines connected to the exchange by producing random variables such as call distances, call durations and reaction times, controlling the test run of a program-controlled control arrangement to which the subscribers imitations and/or line imitations are supplied, and checking the reaction of the exchange and/or mixing the technical statistic parameters of the exchange.

2. Description of the Related Art

Computer-controlled exchanges are generally formed by one or a plurality of single or multi-stage switching networks, a stored program central control and/or a plurality of decentralized control units and adaptor units, which connect the control units to the switching networks. In addition, such an exchange includes transmitters and receivers for signalling data, peripheral control units and further peripheral devices. The exchange receives and responds to signalling and control pulse transmitted to it to the exterior, that is to say from its terminals, for example by subscriber lines, or other connection lines (see FIG. 1).

By means of a traffic simulator a model, i.e. a functional imitation of the exterior (peripheral) network is made and the behaviour of the exchange in realistic traffic conditions is recorded. The external events, such as, for example, accessing subscriber's lines or connection lines, dialling, and lifting the handset by the called subscriber, which are created outside the exchange, are then recorded as event patterns which represent the sequence of events and the times at which such events start. These sequences of events are produced in the traffic simulator, their spectra varying from simple event patterns which are fixed in a controlled manner, to random event patterns. In this situation, the event patterns are determined by the event sequences of all call types prevailing in a simulation. Because of the fact that the external events can be described by event patterns, substantially all the details of a real call can be taken into account.

With such a traffic simulator it is for example, possible to describe and simulate call set-up stages such as lifting the hand set by the calling subscriber, accessing a junctor circuit, waiting for the dialling tone, the dialling phase, signalling, through-connection, calling the desired subscriber, taking the hand-set from the cradle by the called subscriber, release etc. This composite procedure of the exchange process is characterized in that continuation of the process requires new data which are contributed by exterior data sources and at random instants. These new data which occur during the exchange process and are used as input data for continuing the process, are stored in buffer stores. The dialling phase is, for example, characterized in that it is assembled from a plurality of pulses of a predetermined duration (digit), the time intervals between the pulses (digits) following, for example, a predetermined distribution.

The representation of all types of incomplete calls, such as, for example calls with incomplete dialling, the called subscriber is busy, no answer etc. or calls from and to specific terminals such as, for example, private branch exchanges, connections to push-button stations, abbreviated dialling, visitor circuit and further performance characteristics of the exchange station can be simulated by the different event samples. In these situations the event samples do not only imitate all the individual events, but also reflect the influence of the correlation between the occurrence of an event and its arrival, in time, in the central exchange. The time spacings between the events of each type of call can be selected in accordance with special distribution functions which are valid for the use to which the central exchanges are put. Selecting the distribution function is based on statistical tests, the underlying test results being obtained by observations and evaluation of the telephone traffic.

Using the traffic simulation arrangement it must be possible to effect checking of the system behaviour of any central exchange, that is to say a telephone or data exchange, for the public or private (branch) section, as regards their performance and functional capability during the set-up and cancelling of an individual connection up to, for example, one thousand parallel active television and/or data connections, by simulating the behaviour of the subscribers and lines connected thereto. Such a traffic simulation arrangement can then be utilized for checking the efficiency of the central exchange as regards traffic handling and its function as an exchange, the determination of the soft-ware efficiency under load conditions, checking overload protection strategies, investigating the behaviour of one or a plurality of control computers (control units) for brief traffic peaks etc.

During the development and production of a prototype of a central exchange (telephone or data exchange) the establishment of specific technical exchange parameters (test values), for example dialling tone delay, ringing signal delay etc.) is necessary, to enable testing of the designed prototype for its system properties and to be able to determine the effects of design modifications on the unchanged portions of the overall system. With the aid of these technical exchange parameters (test values) it is then possible to prove, when the exchange is handed over to the customer, that the requirements this customer has made as regards the system properties (which are laid down in a standard specification) are respected.

West German Pat. No. DE-PS 32 12 019 discloses a method for an arrangement for traffic simultaion in telephone exchanges, by which the effect of the behaviour of a subscriber on the telephone exchange can be simulated by automatically controlled subscriber imitations. With the aid of the subscriber imitations, controlled by a control computer unit, connections are set-up and cancelled and the reaction of the relevant central exchange is tested. The overall procedure of a connection to be established between two subscribers imitations, is laid down in a store as an an empirically determined command sequence and has intervals at instants which, as is customary, depend on the reaction of the subscriber. To generate a random subscribers behaviour during a predetermined (programmed) functional procedure, intervals are produced, statistically distributed, by means of random generators. During testing of the proper operation of mass-produced central exchanges, each measured parameter is compared with a standard sample (for example obtained by measurements taken on the prototype). For deviations between measured parameters of the actual central exchanges and the specific parameters of standard samples, a corresponding error report is transmitted and the detected failure is eliminated. In doing so, it is possible to check whether the required system parameters and system properties as regards the set-up and cancellation of an individual connection are respected.

In the method disclosed in patent No. DE-PS 32 12 019 subscribers imitations are used to test the hardware and software of the central exchange. The subscribers imitations generate trigger pulses intended for the exchange system, either individually or in groups, and the corresponding system reactions are compared with a standard sample. The trigger pulses assigned to each individual subscriber are determined on the basis of the desired functional procedure (test procedure) in their chronological sequence and at their instant of occurrence. During the comparison with the standard sample, the error report in the case of malfunctioning is put on record (and optionally the test is ended); when there is agreement between the measured parameters and the standard sample, the trigger pulses assigned to a subscriber or a line, respectively, are periodically repeated after exactly the same test procedure.

In that method all the trigger pulses used during the test procedure are predetermined before the beginning of the test as regards their types and instants of appearance. For example, the digits of the subscriber to be dialled (B-Tln), determining that only the called subscriber (A-Tln) or only the B-Tln terminates the call; determining that the speech connection can be effected immediately after a recognised successful call set-up; determining that the time spacing between two event instants satisfies to a limited extent statistical laws for only a portion of all the possible time intervals; are stored. Prior art test arrangements, such as, for example, the call simulator disclosed in West German Pat. No. DT-AS 24 20 773 or the test arrangement disclosed in West German Pat. No. DE-PS 32 15 672, relate only to a physical supervision of the connections to be set-up.

The known test methods (Nos. DE-PS 32 12 019, DT-AS 24 20 773, DE-PS 32 15 672) have the disadvantage that they can only test the physical and logic system properties for a limited number of simultaneously existing connections. However, these system properties (reactions) change when the central exchange is loaded by a maximum system configuration with a nominal load or is overloaded, and due to real subscriber behaviour.

Nominal load must here be understood to mean the maximum possible system configuration (that is to say a maximum line configuragion and/or a maximum number of connected subscribers) and an offered traffic intensity of typically a=0.1 Erl per subscriber and a=0.8 Erl per line. These traffic intensity values change significantly in the course of a day in the so-called main traffic hours or in special periods (in the event of catastrophies). Additionally, brief overload peaks which are critical for the functional reliability of the system may occur. In addition to an increased amount of traffic offered and the consequently increased arrival rate also the what is commonly referred to as the subscriber behaviour changes.

Subscriber behaviour must here be understood to mean that the subscriber becomes nervous or impatient when the connection is not set-up as anticipated by him, which becomes manifest by, for example, an increased number of redialling operations, or that during the call set-up decisions which deviate from the normal rule are made (for example the dialling operation is prematurely terminated). These redialling operations are trigger pulses for the system without, relative to that individual call, a successful call connection can be ascertained.

These different effects as regards the traffic characteristics are taken account of in the prior art test method. The traffic flows thus produced can be represented in a model of a subscriber or a subscribers group of any size (imitation of the traffic circumstances) by the following applied traffic functions:

| | finite number of sources | infinite number of sources |
|---|---|---|
| stationary | $a/Tln$ | $\lambda$ |
| non-stationary | $a(t)/Tln$ | $\lambda(t)$ | where $\lambda$ is the call arrival rate.

SUMMARY OF THE INVENTION

The invention has for its object to provide a traffic simulation arrangement with which an imitation of the traffic circumstances of a central exchange, which approaches reality as much as possible, is achieved. According to the invention a traffic simulator as disclosed in the opening paragraph above is characterized in that the instantaneous behaviour of the connected subscriber and/or line imitations are not predetermined, but adapt themselves randomly to the system reactions.

The traffic simulation arrangement according to the invention has the advantage that simulation of realistic subscriber behaviour is possible. Whereas in prior art traffic simulation arrangements storing a multiplicity of different event samples (all only imaginary subscriber behaviours) requires higher cost and a greater design effort to store, a new subscriber behaviour can now be generated in that, starting from a predetermined position in the program procedure for a given subscriber behaviour, a different subscriber behaviour can be routed to a further position in the program and the overall programm procedure consequently produces the new subscriber behaviour. As a result thereof a change in the subscriber behaviour is possible in dependence on the reaction of the central exchange. With the traffic simulation arrangement according to the invention it is possible to effect the traffic simulation of all the telephone and/or data arrangements and/or lines connectable to a central exchange, taking account of the system feedback on the subscriber behaviour to be simulated and the corresponding system reactions in all possible load situations (that is to say for the case of a nominal load or an overload) at a constant ($\lambda$=constant) and/or time-dependent ($\lambda=\lambda(t)$) call arrival rate can be measured, put on record and be evaluated.

The structure of the subscriber imitation (where subscriber imitation must be understood to mean all the different types of connections, for example telephone lines, data lines) results in that each subscriber imitation has a so-called subscriber memory and that its own subscriber behaviour is presettable. The plurality of different subscribers behaviours is obtained from the imitation of all conceivable actions of a real subscriber at all instants at the system interface assigned to him, which interface is of a random nature depending on the subscriber action or system reaction to be effected. These decisions can be made
on the basis of fixed presettable values randomly in accordance witdh presettable optional distribution functions.

In contradistinction to the prior art traffic simulation arrangements (Nos. DE-PS 32 12 019, DT-AS 24 20 773 and DE-PS 32 15 672), a given test procedure is not definitely preset, but any conceivable subscriber action is possible at each instant and the actual occurrence of the subscriber reaction at a given instant is controlled by the use of random decisions, in accordance with the freely presettable distribution function type for each decision.

This has for its result that also all the new performance characteristics of, for example, a private branch exchange can be optionally imitated as regards its share in the traffic (for example redialling, abbreviated dialling etc.) and a plurality of subscriber behaviours, as, for example, interrupting a dialling operation for different subscriber groups, can be defined. The established connections are consequently not subjected to a fixed, predetermined test procedure but they correspond to the events occurring in actual practice (real imitation), which can be described with the aid of statistic laws.

BRIEF DESCRIPTION OF THE DRAWINGS

The invention will now be described in greater detail by way of example with reference to the embodiments shown in the drawings. Therein.

DESCRIPTION OF THE PREFERRED EMBODIMENTS

Figure 1:
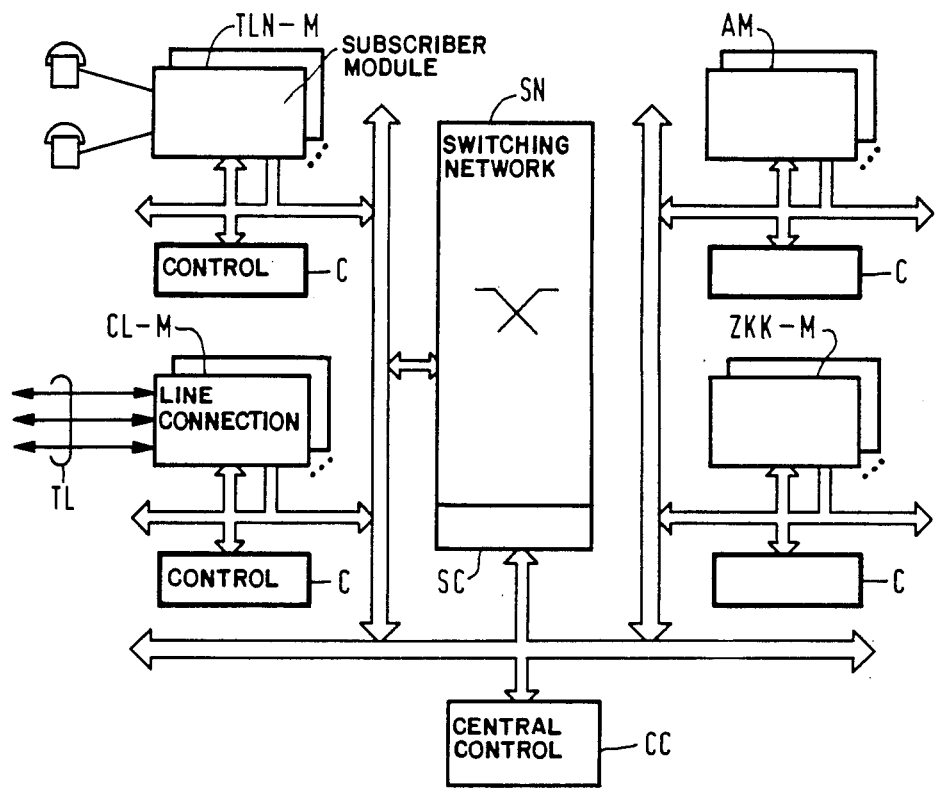
FIG. 1 is a block circuit diagram of a typical computer-controlled telephone exchange.
Figure 2:
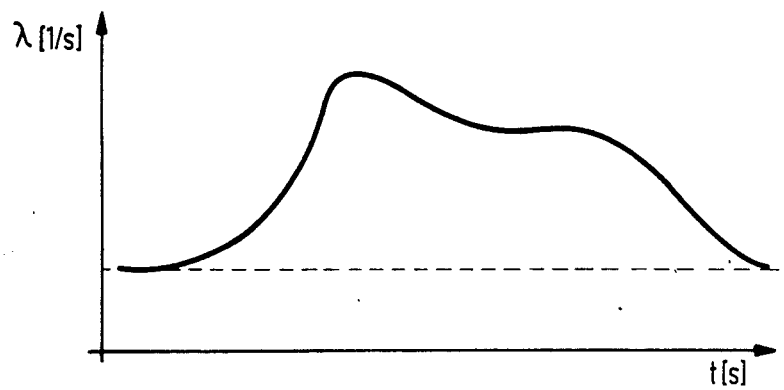
FIG. 2 shows the typical time variation of a non-constant traffic call arrival rate, for example during a day or a brief overload.

FIG. 2 shows the typical variation of an non-constant arrival rate of the overload traffic. Such a variation can be imitated in the traffic simulation arrangement, wherein, according to the invention, the subscriber imitations react in a way similar to a real subscriber and its behaviour changes in dependence on the system reaction. The combination of central exchange and traffic simulation arrangement according to the invention consequently behaves in the same manner as a closed control circuit.

During the imitation of the individual subscriber reactions two cases can be distinguished as regards the predetermined rate of arrival:

(a) the rate of arrival is constant (b) the rate of arrival is time-dependent.

(a) The response of the subscriber to system reactions corresponds to the actually occurring circumstances as regards an undisturbed call set-up. This means that the calling subscriber (A-Tln) passes through its call set-up phase without any effects on the rate of arrival. The individual reactions are random reactions, the spacing between the events obeying statistically presettable distribution functions or fixed preset time intervals. On the basis of call mixes the probability of the occurrence of a given type of occupancy (no dialling, incomplete dialling) and the associated average occupancy period can be indicated. The calling subscriber returns, for example, the hand set prematurely to the cradle with a given probability (dialling interrupt): or he starts with a given probability the dialling operation before the dial tone is given; or the individual time intervals between the digits to be dialled satisfy a distribution function with always different average values; or he has a distribution-function determined patience to wait for the ringing signal whereafter he breaks, for example, the connection without entering the call phase etc.

Imitating the called subscriber (B-Tln) is effected on the basis of predetermined probabilities, for example the probability that he will indeed take the call, that he waits a predetermined period of time before accepting the call, that he carries on the conversation for a predetermined time and/or that an accepted call for a third subscriber (C-Tln) is rerouted within a private exchange etc. ...

The individual reactions of the called subscriber and the calling subscriber depend on the actual system reaction. Thus, the calling subscriber has a different subscriber behaviour, for example dialling behaviour, when he started dialling without waiting for the dial tone. In that case the first dialled digits are not detected by the central exchange and the subscriber receives already during his dialling procedure (dialling of the total subscribers number) the busy tone or a different busy indication from the central exchange. A change in the subscribers behaviour depending on the system reactions implies that he responds to that signalling, in that he interrupts the dialling operation and possibly starts immediately a new dialling trial or he continues his dialling operation and then, after the total subscribers number has been dialled returns the hand set immediately to the cradle, etc. ...

(b) The reaction of the subscribers to system reactions must correspond to the reactions described sub (a). The rate of arrival λ of such events is also a function of time. This dependence on time can be derived from randomly presettable distribution functions (for example in accordance with the generalised Poisson procedure, etc.) or be determined from fixed presettable load profiles. Thus, the time intervals for the arrival of events can, for example, be described with time-dependent distribution functions (Tran-Gia, P., "Ueberlastprobleme, in rechnergesteuerten Fernsprechvermittlungssystemen - Modellbildung und Analyse", 36. Bericht über verkehrstheoretische Arbeiten, Institut für Nachrichtenvermittlung und Datenverarbeitung, Universität Stuttgart, 1982).

A different type of increasing the arrival rate λ, the dynamic increase in traffic offered, determined by system feedback, is, for example, obtained in that the subscriber reacts in a nervous manner to system reactions. If the called subscriber does not accept the call, then the calling subscriber can now try to trace this subsriber at all the call numbers which he thinks to have sense. He will now dial all these call numbers sequentially and recurrently, until he has contacted said subscriber.

Recording the individual subscribers call mixes is effected using a finite automat or possible patterns of events for each subscriber and can be specified by a SDL-type description language and be programmed with higher programm images. Describing the subscribers behaviour with the aid of event chains (Wizgall, M., "Ueber Architektur, Betriebsweise und Verkehrsverhalten einer rechnergesteuerten Vermittlungsstelle", 27. Bericht über verkehrtheoretische Arbeiten, Institut für Nachrichtenvermittelung und Datenverarbeitung, Universität Stuttgart 1980) or with the aid of finite automats (Tran-Gia, P., "Ueberlastprobleme in rechnergesteuerten Fernsprechvermittlungssystemen—Modellbildung und Analyse", 36. Bericht über verkehrtheoretische Arbeiten, Institut für Nachrichtenvermittlung und Datenverarbeitung, Universität Stuttgart 1982) is used in model building techniques for traffic-theoretical system investigation. Changes in the programs and extending programs can be effected in a simple way, it then being possible to take each subscriber reaction into account. As a result thereof (parametrical) subscriber behaviour profiles for

- telephone subscribers, connected to a private exchange,
- operator positions within a private branch exchange
- telephone subscriber, connected to a local switching exchange
- digital subscriber arrangements connected to a private branch exchange
- digital subscriber arrangements, connected to a local exchange
- service line, connected to a private branch exchange
- telephone lines and/or signalling channels of a through-exchange
- digital subscriber arrangement of existing and future communication systems can be specified and implemented in a simple way and manner.

Each individual subscriber reaction and system reaction, and also the time spacing between subscriber events and all system events can be statistically evaluated. The evaluation can then be related to predetermined subscriber reactions, to a specific subscriber, to system reactions, to falling short off or exceeding given time intervals etc. As a result of the subscriber simulation there are not only error protocols about a specific hardware or software errors in a given call-set-up/cancelling phase, but also simulated test values are obtained which give an impression of:

- actual arrival rates (per subscriber, per subscriber group etc.)
- number of rediallings on the basis of the report "subscriber busy", internal blocking of the exchanges, etc.
- number of actually effected internal/external telephone conversations.

In the traffic simulation it is then not of importance whether a dialling procedure of a specific subscriber was disturbed by hardware or software errors in the exchange, but the error is statistically laid down. The subscriber reaction imitation (Tln in FIG. 3) responds to the disturbing event in the same way as a real subscriber would respond to this event.

By means of the traffic simulation arrangement according to the invention it is not only possible to perform a load test but also a functional test, that is to say the specific setting of each state of the exchange. It is, for example, possible to specially produce the state "Tln i effects a consultation call" and "Tln j effects an external call" and "A number k of subscribers carry on internal calls" and based thereon a new call set-up can be tested. In view of the large number of possible systems states, a statistical test is here preferably effected, that is to say only a limited number of possible system states is checked and if they are free from errors it is decided, using a prediction probability, that all system states are free from errors.

Figure 3:
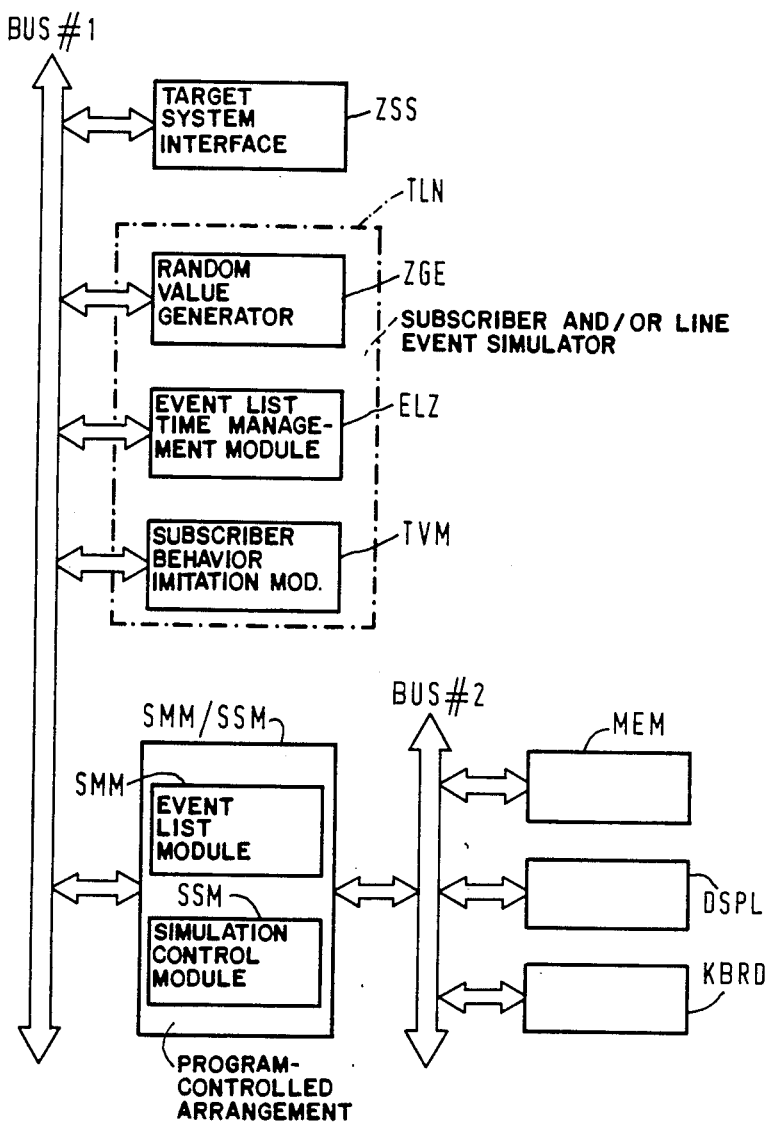
FIG. 3 shows the block circuit diagram (hardware) of the traffic simulation arrangement according to the invention and FIG. 4 shows the software functional division (software structure, data structure, communication structure by the exchange of reports) of the traffic simulation arrangement according to the invention.

FIG. 3 shows the traffic simulation arrangement UNES (UNES: Universal Environment Stimulator) according to the invention in the form of a block circuit diagram. The traffic simulation arrangement UNES comprises a program-controlled control arrangement SMM/SSM, subscriber and/or line imitations TLN and an inerface unit ZSS, which are interconnected via a bus system 1. The subscriber imitation Tln is divided into a first arrangement TVM for producing the subscriber behaviour, a second arrangement ELZ for managing the event list and the time between two event moments and a third arrangement ZGE for producing random values. Depending on the efficiency of the individual arrangements, said functions can be combined in one arrangement or alternatively be still further sub-divided into further arrangements.

In addition to controlling the test procedure of the traffic simulation arrangement UNES, also the statistical evaluation of the test results is effected in the program-controlled control arrangement SMM/SSM. Mass storage means, printers and an operating device are connectable to the program-controlled control arrangement SMM/SSM. By means of these arrangements, the traffic simulation UNES is programmed by the user in accordance with the simulation procedure provided. Programming comprises, for example, specifying the distribution functions, the number of subscribers, the call number ranges. With the aid of the programm-controlled control arrangement SMM/SSM the object to be tested (exchange, private branch exchange etc.) connected to the traffic simulator UNES can be shaped via the interface unit ZSS and the exchange software of the subscriber to be tested can be loaded from the connected mass storage means.

In the first arrangement TVM the actual subscriber behaviour is imitated with the aid of a finite automat. The imitation can be based on the consideration that at any instant each subscriber is in a defined state, from which he passes again into a subsequent, also defined, state in response to a system reaction, (signalising of an event in the central exchange) or a subscriber reaction.

In the second arrangement ELZ the event instants for the specific associated simulated subscriber and/or lines are managed. In the third arrangement ZGE all the random values for UNES are produced. The random variables may be uniformly distributed or be determined in accordance with a programmable distribution function.

The generation of random variables with optional distribution function is effected in the traffic simulator UNES with the aid of discrete hardware modules and is effected in two steps:

First a random number is generated which is uniformly distributed in the half-open interval (0.1). This what is commonly referred to as basic random number is then mapped by conversion in the predetermined distribution function on the actual random variables (Fishman, G. S.: "Principles of Discrete Event simulation" John Wiley, New York 1978).

The generated random numbers are so-called pseudo-random numbers which are generated in accordance with a fixed and consequently reproducible method.

Two principal methods can be used for generating the basic random number:

1. Shift register sequences (M-sequences)

A binary shift register having a length of n bits is fed back in such a manner that a "maximum-sequence (m-sequence)" of the length $2^{n}-1$ is obtained (Golomb, S.

W.: "Shift Register Sequences" Holden Day, San Francisco, 1967). A bit position can be taken from the shift register as an appropriate realisation of a random number with the two equally probable values 0 and 1.

For generating a k-bit random dual number with the value range $0 \ldots 2^{k}-1$, k shift registers with different sequences or different sequence lengths, the modulo-2 linking of sequences or similar methods can be used, which ensures the statistical independence from each other of the k-bits.

The k-bit random dual number is normalized by dividing it by $2^k$ to the above-mentioned value range (0.1) of the random number. The length k of the random dual number determines the resolution $2^{-k}$ of the random number.

2. Multiplicative-additive method.

The method produces a new k-bit random dual number $X_{i+1}$ from the old number in accordance with the formation law:

$$X_{i+1} = (\lambda \cdot X_i + c) \bmod p.$$

It requires the arithmetical operations: modulo-formation, addition and multiplication; each of these operations however only once for each new random dual number. For some small values of $\lambda$, c and p a sufficient number of little autocorrelated random dual number sequences are obtained (Knuth, D. E.: "The Art of Computer Programming" Vol. 2, Addison-Wesley, Reading, Massachusetts, 1981).

In the traffic simulator UNES the equally distributed random quantities, basic random numbers, are obtained by means of the multiplicative congruence method, (Ide H. D., Sägebarth J.,: "On Properties of Random Number Generators and their Influence on Traffic Simulation", Proc. $10^{th}$ International Teletraffic Congress, Montreal 1983, paper 2.4.6). It can be realised using discrete hardware modules or program-control (for example micro-process control). If random variables are produced with the aid of discrete hardware modules, this will require a significantly shorter period of time compared with the program-controlled generation. On the other hand, the program-controlled generation has the advantage that a more flexible implementation is possible. In the traffic simulation arrangement UNES the basic random numbers are generated with the aid of discrete hardware modules and converted by a subsequent RAM-store into the desired distribution function. The number of distribution function thus produceable and mean value-scaling-multiplication (Fishman, G. S.: "Principle of Discrete Event Simulation", John Wiley, New York, 1978) is in principle unlimitted. It is only limited by the required cost and design effort for the store.

The exchange of exchange-technical events between the traffic simulator UNES and the exchange to be tested is effected via the interface unit ZSS. The interface unit ZSS may be of such a construction that the exchange-technical event reports (optionally after analog-to-digital conversion) are exchanged at the speech wires (a.wire, b.wire) of a subscribers terminal or at the inputs or a local connecting line/telephone connection line (depending on the type of switch-through 2 to 6-wire) or at the inputs of a selector group (3-wire) or immediately at the control logic level of the exchange (central control). Connecting the traffic simulator UNES in a fully digital data network may thus be effected to each of the control logic levels.

When coupling is effected to the control logic levels (internal interface) of the central exchange, the cost and design efforts as regards the circuit for the connection of a plurality of subscribers or lines can be significantly be reduced. In this case all the event reports between the subscriber simulator and the central exchange connected to the traffic simulator (UNES) can be exchanged via one of a plurality of digital interfaces ZSS, which can be realised at low circuit cost.

Because of the fact that there are two possibilities for connection to the subscriber lines or connecting lines, respectively or to the control logic levels the traffic simulator UNES may be operated as (a) additional load to a central exchange which is already operative (b) as a complete imitation of the traffic circumstances (all the subscribers, connecting lines of a local exchange, trunk central exchange, private branch exchange etc.).

In case (a) the real subscribers produce already a fundamental load. With the aid of the traffic simulator UNES further simulated subscribers can now be connected to the central exchange and the effects of the now additionally introduced load on the central exchange can be investigated (for example measuring the dialling tone delay, ringing tone delay, internal blocking etc.). In addition thereto, the load profiles of real subscribers occurring in actual practice in an exisiting central exchange can be measured and stored. To that end the traffic simulator UNES dows not transmit or receive exchange technical trigger pulses during the measuring procedure in the central exchange. The trigger pulses of the real subscriber to be processed by the central exchange are reported by the central exchange to the traffic simulator UNES, are statistically evaluated there and the result is stored in, for example, a mass-storage means. The stored data can now be used as the starting point for the event arrival rate, event completion rate, dialling set-up and cancelling, etc. during the simulation in the traffic simulator UNES. Consequently, all the time-linked load profiles, for all subscribers connectable to a central exchange and which in, for example, already operative central exchanges will result in overload conditions and possibly in switch-off of the central exchange can be repeated as often as wanted for testing improvements in the test field (laboratory).

In case (b) a realistic subscriber's fundamental load is connected to the central exchange with the aid of the traffic simulator UNES. By means of a few subscriber's already connected to the central exchange, new special power characteristics of the central exchange can be tested in approximately realistic external conditions in the test field and then be transferred error-free to existing central exchanges.

Figure 4:
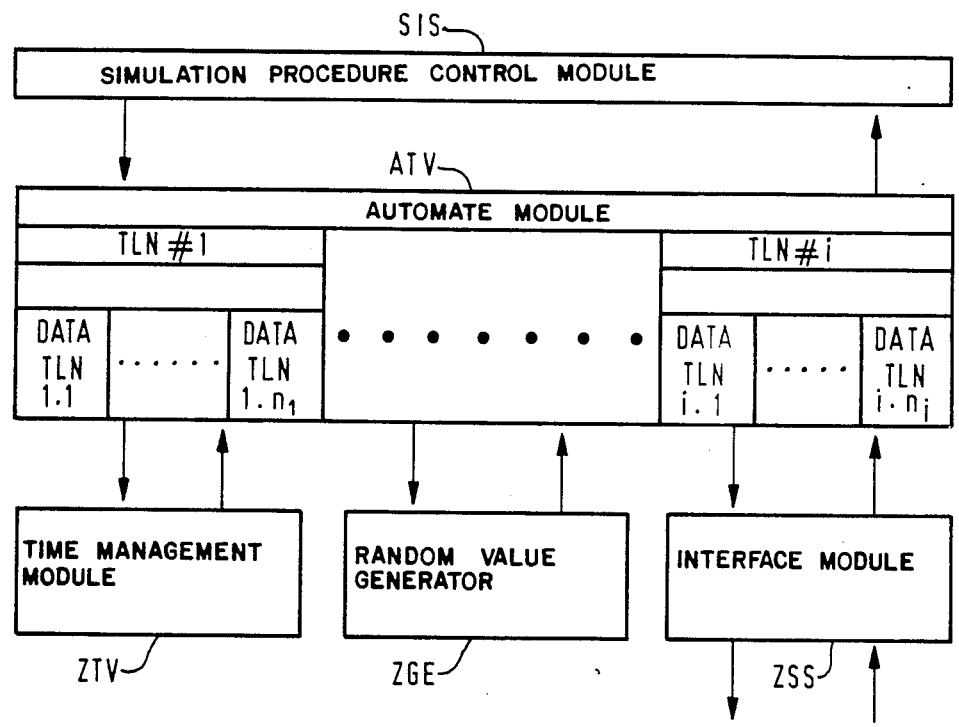

FIG. 4 shows an embodiment for the functional distribution of programm modules (sub-programms) over the individual arrangements of the traffic simulator UNES shown in FIG. 3. FIG. 4 shows only the most important five modules, more specifically the simulation procedure control module SIS, the finite automat module for subscribers behaviour ATV, the time-management modules ZTV, the random values—producing module ZGE and the target system (interface module ZSS).

For a simulation run, the module SIS initiates all the other modules in accordance with corresponding user details, starts, supervises, terminates the simulation run, and the test data obtained during a simulation run are intermediately stored and processed. The control of a simulation run is effected via SIS-ATV reports. The test data produced during a simulation run are transferred from the ATV module to the SIS module by means of ATV-SIS or ZSS-SIS reports, respectively for the purpose of intermediate storage. These test data are produced by system reactions or subscribers reactions, which effect predetermined changes in state in the ATV module. The automats in the ATV module for imitating the subscribers behaviour can be sub-divided into different subscribers types, such as, for example, subscribers lines, private branch exchange subscribers, operator places, etc. Each type is characterized by its associated program and data ranges.

The imitation of the time-dependent and random subscribers behaviour in the ATV module are supported by the ZTV and ZGE modules. To lay down the subscribers action, for example in response to a system reaction, the required random values are demanded by an ATV-ZGE report and answered by a SGE-ATV report. On the basis of these random values, the, for example, moment for the next subscribers action is obtained. This moment is transferred by an ATV-ZTV report to the ZTV module. The ZTV module manages the absolute simulation instants and informs the ATV-module by means of ZTV-ATV reports that now a specific subscriber wants to effect a specific subscriber action. This action is effected in the ATV-module by means of a transition in the automat for the subscribers behaviour then used and is reported to the module ZSS by means of an ATV-ZSS report. The module ZSS now takes over the task of reporting the subscribers action to the target system in accordance with the logic and physical coupling to the target system. In accordance therewith, system reactions are conveyed from the module ZSS to the module ATV using ZSS-ATV reports. With the aid of ZSS-SIS reports absolute simulation instants can be conveyed to the module ZSS for statistically evaluating all the reports the module ZSS receives from the target system or which are transmitted to the target system, respectively. These ZSS-SIS reports are now conveyed by the module ATV to the module SIS. As a result thereof it is possible to effect time measurements independently of the internal processing rate of the external simulation arrangement UNES and with a resolution of, for example, 1 msec.

For performing time measurements, predetermined reports are provided with a date. The, for example, absolute simulation instants at which ATV-ZSS Reports are transferred to the module ZSS can be retained by the module ATV and conveyed to the module SIS. In addition, the absolute simulation instants of the reports transmitted to and received by the central exchange to be tested can be obtained in the module ZSS and transferred to the module SIS. A comparison between the two instants in the module SIS shows the internal delay time in the traffic simulation UNES, so that the important advantage of self-supervision is maintained.

What is claimed is:

1. An improved traffic simulator for testing a telephone exchange, which simulates the behavior of subscribers and lines connected to the exchange by producing random event variables such as call distances, call durations and reaction times which actuate a program-controlled control arrangement which checks the reaction of the exchange to such events and mixes the statistical technical parameters of the exchange; such improvement being characterized in that the instantaneous behavior of the subscriber and line simulations are not predetermined, but adapt themselves randomly to the system reactions, and that such simulator comprises a first circuit arrangement (TVM) for producing the subscriber and line event simulations, a second circuit arrangement (ELZ) for determining event instants, a third circuit arrangement (ZGE) for producing the random event variables, an interface unit ZSS for transmitting absolute simulation instants to the exchange, and a simulation control (SIS) to which the exchange transfers reports of received events; whereby the reaction times of the exchange to such events can be measured without measuring the internal time delays of the simulator.

2. An improved traffic simulator in accordance with claim 1, further characterized in that the first circuit arrangement (TVM) simulates subscriber behavior by means of a finite number of possible patterns of such behavior which take into account the reactions of the exchange to such behavior.

3. An improved traffic simulator in accordance with claim 1, further characterized in that the third circuit arrangement (ZGE) comprises discrete circuits which generate uniformly distributed random numbers by multiplicative congruent methods, and a programmable memory which converts such uniformly distributed random numbers into a distribution function.

* * * * *